US012712248B2

(12) United States Patent
West et al.

(10) Patent No.: US 12,712,248 B2
(45) Date of Patent: Aug. 18, 2026

(54) ULTRA-ULTRA WIDE BAND AESA ARCHITECTURE

(71) Applicant: Rockwell Collins, Inc., Cedar Rapids, IA (US)

(72) Inventors: James B. West, Cedar Rapids, IA (US); Ross K. Wilcoxon, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 20 days.

(21) Appl. No.: 18/925,949

(22) Filed: Oct. 24, 2024

(65) Prior Publication Data

US 2026/0121275 A1 Apr. 30, 2026

(51) Int. Cl.
*H01Q 1/02* (2006.01)
*H01Q 1/12* (2006.01)
*H01Q 21/30* (2006.01)

(52) U.S. Cl.
CPC ................ *H01Q 1/02* (2013.01); *H01Q 1/12* (2013.01); *H01Q 21/30* (2013.01)

(58) Field of Classification Search
CPC ............ H01Q 1/02; H01Q 1/12; H01Q 21/30
See application file for complete search history.

(56) References Cited

U.S. PATENT DOCUMENTS

| | | | | |
|---|---|---|---|---|
| 9,116,222 | B1 * | 8/2015 | Ellsworth | H01Q 1/02 |
| 10,374,812 | B2 | 8/2019 | Schepers et al. | |
| 10,694,637 | B1 * | 6/2020 | Wolf | H01Q 1/002 |
| 10,714,840 | B1 * | 7/2020 | West | H01Q 21/30 |
| 11,336,468 | B2 | 5/2022 | Nguyen et al. | |
| 11,367,954 | B1 * | 6/2022 | West | H01Q 21/22 |
| 11,893,112 | B2 | 2/2024 | Guilley et al. | |
| 2022/0239506 | A1 | 7/2022 | Palmer et al. | |

* cited by examiner

*Primary Examiner* — Seung H Lee
(74) *Attorney, Agent, or Firm* — Suiter Swantz IP

(57) ABSTRACT

An AESA antenna system with RF Beamformer PCB assemblies includes integrated radiating elements. The system utilizes a swappable PCB assembly with integrated thermal management. Such integrated thermal management may include a heat pipe thermal spreader, compatible with a PCB assembly to create a brick AESA architecture. A card cage and linear array mechanical assembly are configured to host a linear array of PCBs that span the UUBW spectrum within a common mechanical assembly. The PCBs in the brick AESA architecture can be configured/reconfigured within a wavelength scaled aperture (WSA) architecture.

20 Claims, 11 Drawing Sheets

ULTRA-ULTRA WIDE BAND AESA ARCHITECTURE

BACKGROUND

Thermal dissipation in active electronically scanned arrays (AESAs) is increasingly challenging with higher operating frequencies. Multi-layer radio frequency (RF) printed circuit board (PCB)-based "Tile" AESA architectures generally provide relatively poor thermal conduction paths with high thermal resistance through the PCB to the heat sink location.

Ultra-wide band (UBW) "brick" card-based AESAs with embedded thermal management exist. Such bricks enable AESA Aperture size scalability for a given frequency spectrum with ½ wave element lattice sampling at the highest operating frequency for grating lobe-free operation. A linear array of such bricks is size scalable with radiation aperture contour flexibility (rectangular, square, elliptical, circular, etc.) for mobile platform operation. Multiple full aperture card cages can be "racked and stacked". Backend configurability allows quick integration of new technology.

Low thermal resistance spreaders, such as oscillating heat pipes, provide conduction paths to a common thermal load/heat sink. Top-level thermal management is system-level agnostic and compatible with air-cooled, liquid-cooled, conduction-cooled, energy-storage, etc. Various thermal spreader materials have been considered for card-fed arrays. Analysis using estimated overall thermal resistances, combined with assumed temperature limits, has identified card-fed array architectures that can potentially manage substantially higher thermal dissipation capacity than planar arrays.

Brick AESA architecture has certain drawbacks. The separate, "connectorized" aperture is mechanically/environmentally challenging; the "eggcrate" mechanical assembly required to position and hold the individual radiating elements requires a very expensive fabrication process to maintain tight mechanical tolerances required for proper Balanced Antipodal Vivaldi Antenna (BAVA) aperture performance. Literally hundreds of small connectorized PCBs must be aligned with high precision within the mechanical registering eggcrate.

The mechanical precision required for proper RF connector registration, and the quantity of connectors, significantly increases recurring cost. For AESA ½ wavelength lattice spacing at the highest operating frequency (e.g. 18 GHZ), the aperture becomes increasingly oversampled for lower operating frequencies. For example, an 18 GHZ ½ sampled aperture is over-sampled by a factor of nine times when operating at 2 GHz. This increases part count and adds thermal dissipation, which exacerbates the need for advanced thermal management within very small volumes; in turn, increasing DC power consumption and requiring more exotic and expensive technologies, and mechanical architectures.

The baseline mechanical architecture does not allow greater than 18 GHz lattice spacing adjustment as grating lobes will begin to appear at frequencies above 18 GHz. Likewise, the baseline architecture does not allow reconfiguration for frequencies below 2.0 GHz.

The need exists for an easily reconfigurable and mechanical size-scalable, multi-phase center, Ultra-Ultrawideband (UUWB), two-dimensional scanned (2D) AESA directional antenna encompassing the UHF-Ka band frequency spectrum. Such an AESA architecture is critical for multi-function RF systems in support of radar, communications, datalink, direction finding, and electronic warfare systems.

SUMMARY

In one aspect, embodiments of the inventive concepts disclosed herein are directed to an AESA antenna system with RF Beamformer PCB assemblies having integrated radiating elements. The system utilizes a swappable PCB assembly chassis with integrated thermal management. Such integrated thermal management may include a heat pipe thermal spreader, compatible with a PCB assembly to create a brick AESA architecture.

A card cage and linear array mechanical assembly are configured to host a linear array of PCBs that span the UUBW spectrum within a common mechanical assembly. The PCBs in the brick AESA architecture can be configured/reconfigured within a wavelength scaled aperture (WSA) architecture.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
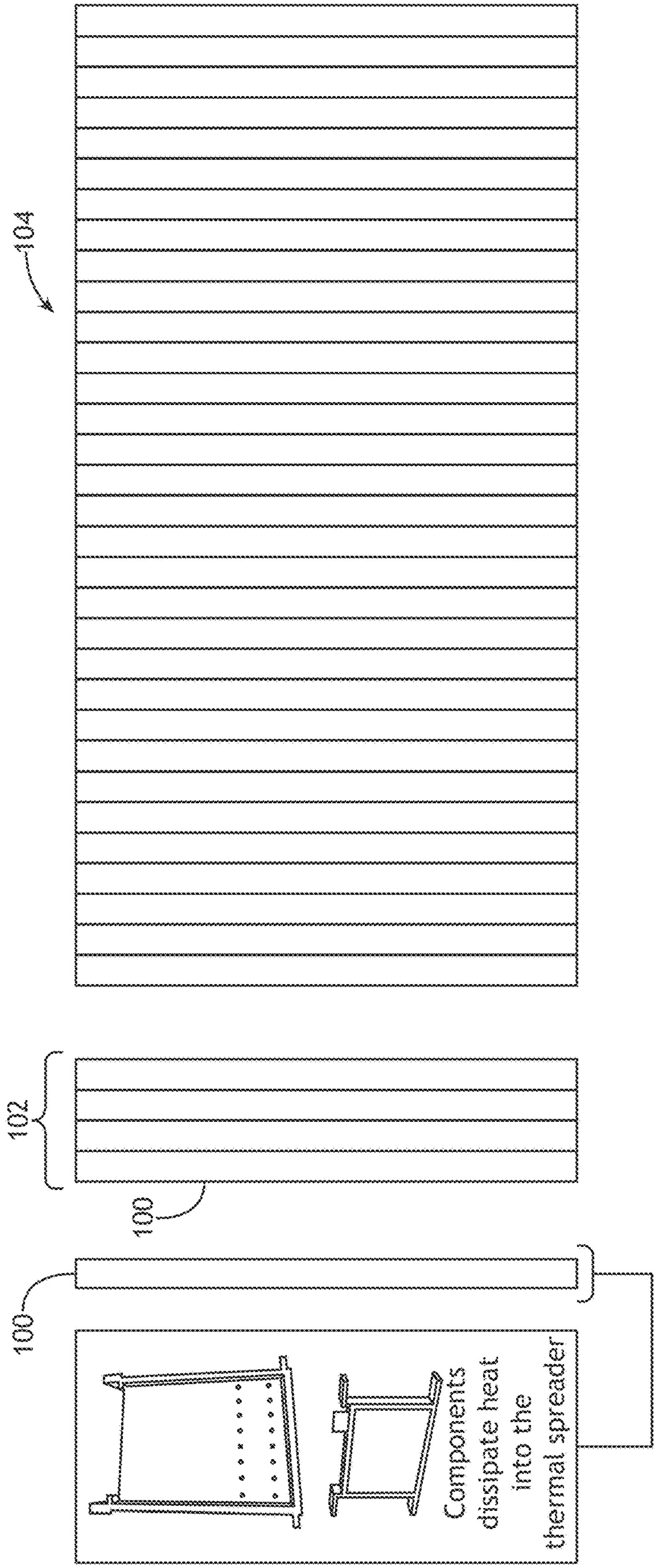
FIG. 1 shows a front view of a card-based array according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an AESA antenna system with RF Beamformer PCB assemblies having integrated radiating elements. The system utilizes a swappable PCB assembly chassis with integrated thermal management. Such integrated thermal management may include an oscillating heat pipe thermal spreader, compatible with a PCB assembly to create a brick AESA architecture. A card cage and linear array mechanical assembly are configured to host a linear array of PCBs that span the UUBW spectrum within a common mechanical assembly. The PCBs in the brick AESA architecture can be configured/reconfigured within a wavelength scaled aperture (WSA) architecture.

Referring to FIG. 1, a front view of a card-based array 104 according to an exemplary embodiment is shown. The card-based array 104 comprises self-contained subarrays 102, each subarray 104 including a plurality of individual PCBs 100. For example, each subarray 104 may include four integrated cards 100.

In at least one embodiment, each card 100 comprises a linear array with embedded radiating elements or separate, mechanically attached radiating elements, and thermal management features. Components of the card 100 dissipate heat into an integrated thermal spreader. In at least one embodiment, the radiating elements may comprise notched Vivaldi Radiators. Furthermore, the radiating elements may be linear polarized or dual orthogonal linearly polarized. Linear array RF combing/processing may be through second level analog beamforming or digital beamforming.

Analog beamforming may be time delay-based beam steering. Sub-banded analog beamforming may utilize phase shifters in a beam de-squinting, fast tuning mode for certain applications. For digital beamforming, an RF combiner may either host ultra-high-speed DACs/ADCs, or utilize digital sampling hardware. The RF combiner may be frequency sub-banded and a swappable subassembly for mission reconfiguration. Power supplies may be compatible with multiple frequency bands, or may be sub-banded.

Figure 2A:
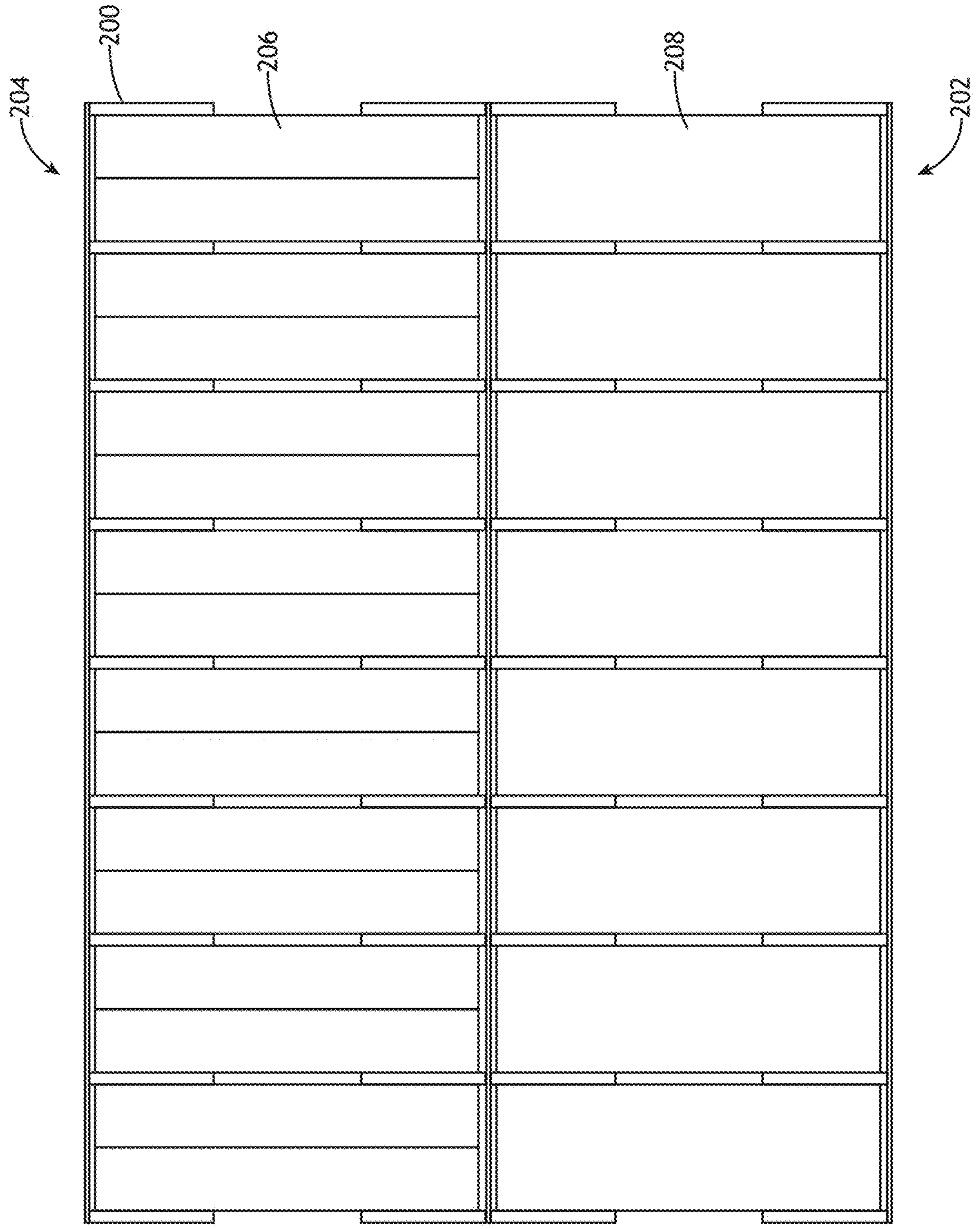
FIG. 2A shows a front view of a card-based array according to an exemplary embodiment.
Figure 2B:
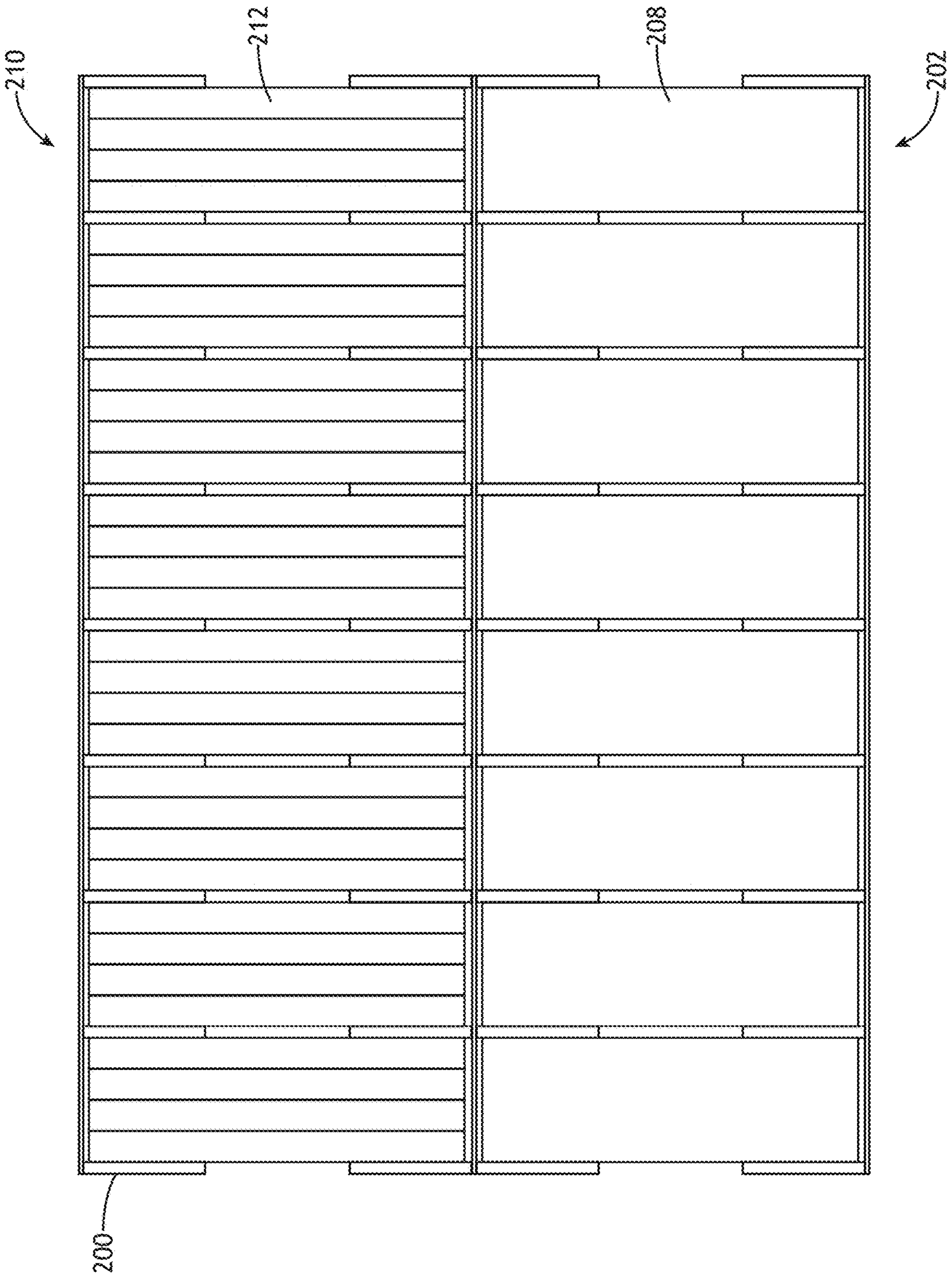
FIG. 2B shows a front view of a card-based array according to an exemplary embodiment.

Referring to FIGS. 2A-2B, front views of a card-based array according to an exemplary embodiment are shown. The card-based array comprises a common chassis 200 defining bays for receiving subarrays 202, 204, 210 of PCBs 100. The subarrays 202, 204, 210 are configured to be swappable into any bay of the chassis 200. For example, each subarray 202, 204, 210 is configured to engage feed components and thermal management components in the chassis 200 or disposed on the chassis 100. Each subarray 202, 204, 210 comprises one or more PCBs 208, 206, 212. The PCBs 208, 206, 212 are configured to operate within a certain frequency range or spectrum.

In one exemplary embodiment, the chassis 200 may include a plurality of low-frequency band subarrays 202 (subarrays of relatively low-frequency band PCBs 208), and a plurality of mid-frequency band subarrays 204 (subarrays of mid-frequency band PCBs 206). In another exemplary embodiment, the chassis 200 may include a plurality of low band subarrays 202 and a plurality of high-frequency band subarrays 210 comprising high-frequency band PCBs 212.

In at least one embodiment, each of the subarrays 202, 204, 210 includes integrated thermal spreader features that are compatible with the heat sinks in the corresponding bay of the chassis 200. The subarrays 202, 204, 210 may include thermal spreaders that incorporate heat pipes.

The subarrays 202, 204, 210 may be ½ wave lattice spaced for grating lobe-free operation. In at least one embodiment, the high-frequency band subarray 210 may include multiple vertical linear array PCBs 212 to maintain horizonal ½ wave aperture lattice spacing appropriate for high-frequency band operation.

For low-frequency band arrays and mid-frequency band arrays, the corresponding subarrays 202, 204 may include one low-frequency band PCB 208 or one mid-frequency band PCB 206, ½ wavelength spaced at the highest operating frequency. For high-frequency band arrays, the high-frequency band subarrays 210 include multiple high-frequency band PCBs 212, each ½ spaced at the highest operating frequency. The bays may be space horizontally for the mid-frequency band arrays. It may be appreciated that while embodiments herein describe three frequency bands, any number of frequency bands are envisioned.

Figure 3:
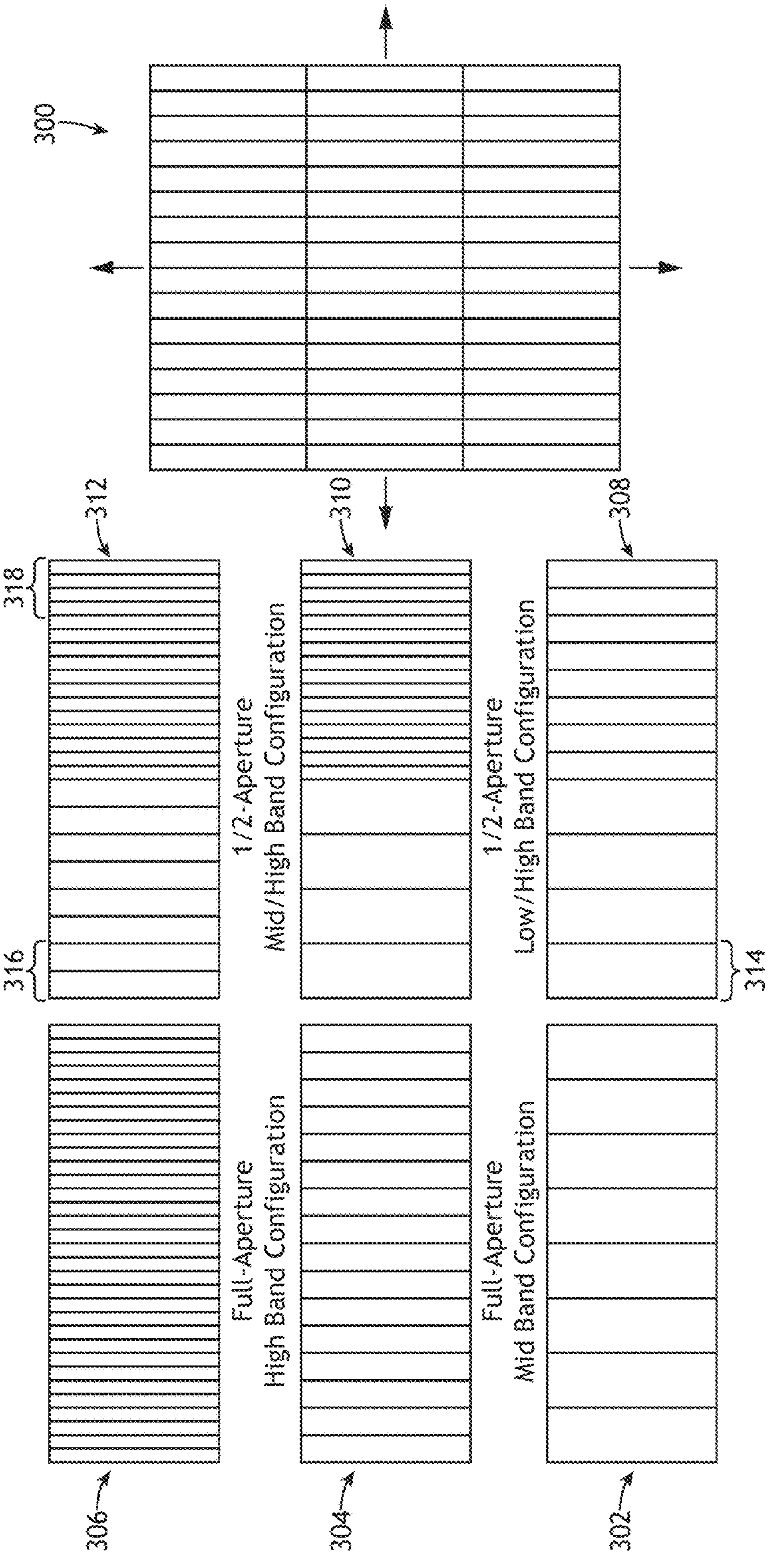
FIG. 3 shows front views of various card-based arrays according to exemplary embodiments.

Referring to FIG. 3, front views of various card-based arrays 302, 304, 306, 308, 310, 312 according to exemplary embodiments is shown. A 2D array 300 of modular subarrays 314, 316, 318 may be expanded either vertically or horizontally. In at least one embodiment, because the 2D array 300 comprises a chassis of modular bays, rows of the chassis may comprise a single type of array 302, 304, 306 for a full-aperture configuration. For example, a low-frequency band configuration of card-based arrays 302 may include only low-frequency band subarrays 314 of PCBs; likewise, a mid-frequency band configuration of card-based arrays 304 may include only mid-frequency band subarrays 316 of PCBs, and a high-frequency band configuration of card-based arrays 306 may include only high-frequency band subarrays 318 of PCBs.

Alternatively, rows of the chassis may comprise multiple types of arrays 308, 310, 312 for a half-aperture configuration. For example, a low/mid-frequency band configuration of card-based arrays 308 may include a section of low-frequency band subarrays 314 of PCBs and a section of mid-frequency band subarrays of 316 of PCBs. Likewise, a low/high-frequency band configuration of card-based arrays 310 may include a section of low-frequency band subarrays 314 of PCBs and a section of high-frequency band subarrays 318. Furthermore, a mid/high-frequency band configuration of card-based arrays 312 may include a section of mid-frequency band subarrays 316 of PCBs and a section of high-frequency band sub arrays 318 of PCBs.

Figure 4A:
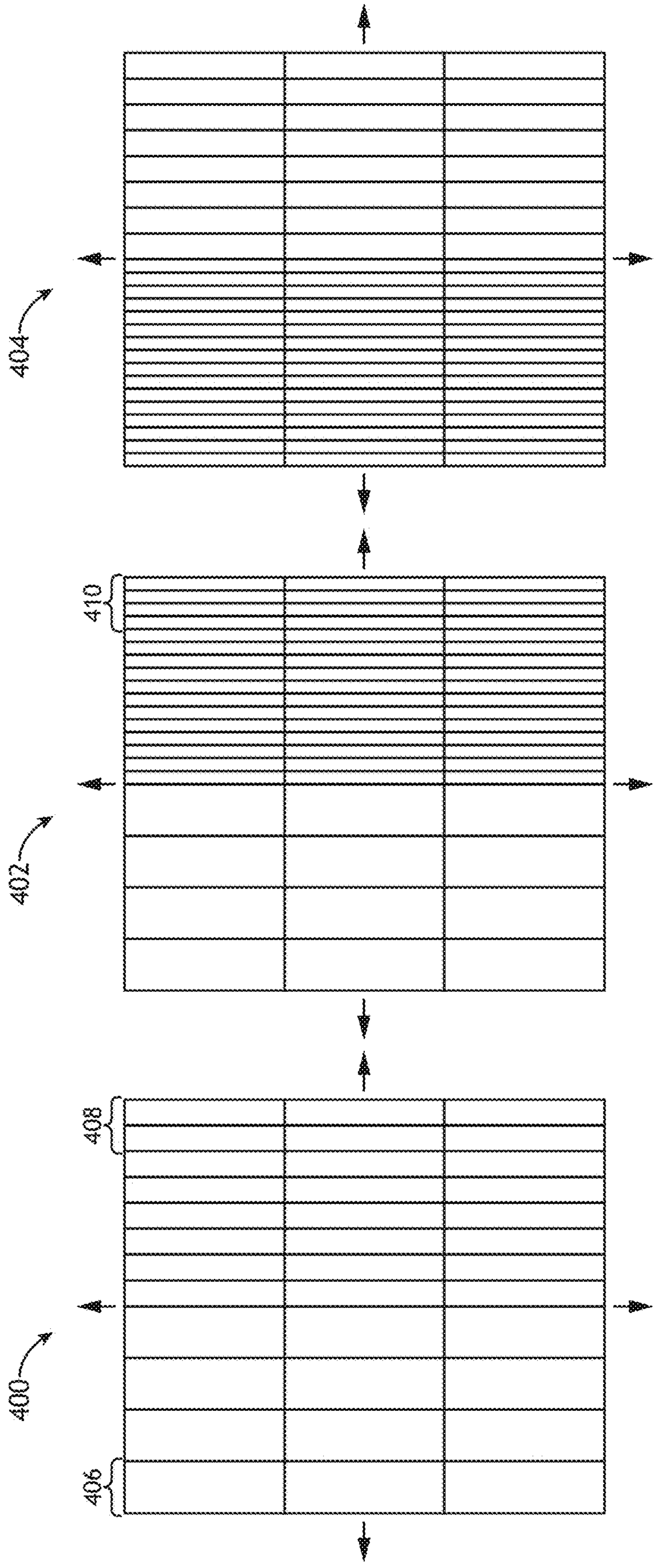
FIG. 4A shows front views of various card-based arrays according to exemplary embodiments.
Figure 4B:
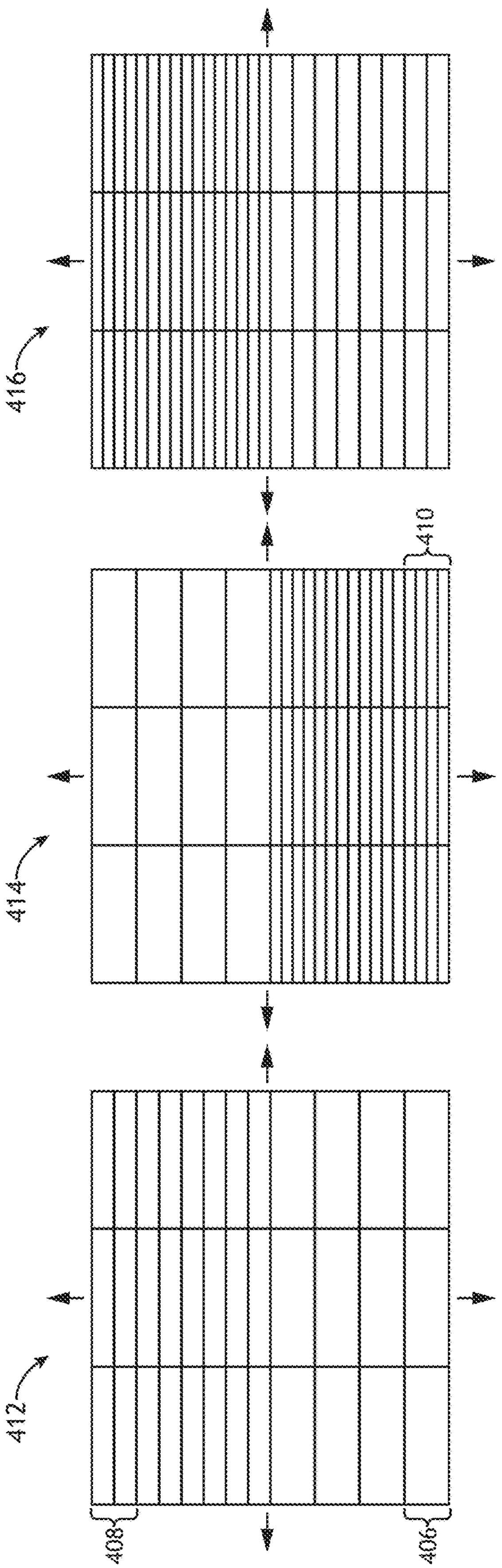
FIG. 4B shows front views of various card-based arrays according to exemplary embodiments.

Referring to FIGS. 4A-4B, front views of various 2D card-based arrays 400, 402, 404, 412, 414, 416 according to exemplary embodiments are shown. Each 2D array 400, 402, 404, 412, 414, 416 comprises a chassis with rows or columns in half-aperture configurations depending on the orientation of the 2D array 400, 402, 404, 412, 414, 416.

For example, a low/mid-frequency band 2D array 400 includes low-frequency band subarrays 406 and mid-frequency band subarrays 408; a low/high-frequency band 2D array 402 includes low-frequency band subarrays 406 and high-frequency band subarrays 410; and a mid/high-frequency band 2D array 404 includes mid-frequency band subarrays 408 and high-frequency band subarrays 410. Vertical 2D arrays 400, 402, 404 may comprise consistent rows, replicated vertically. Likewise, for horizontal 2D arrays 412, 414, 416, the 2D arrays 400, 402, 404 may be oriented such that columns are consistent and may be replicated horizontally. Quantized wavelength scaling is possible horizontally.

Figure 5:
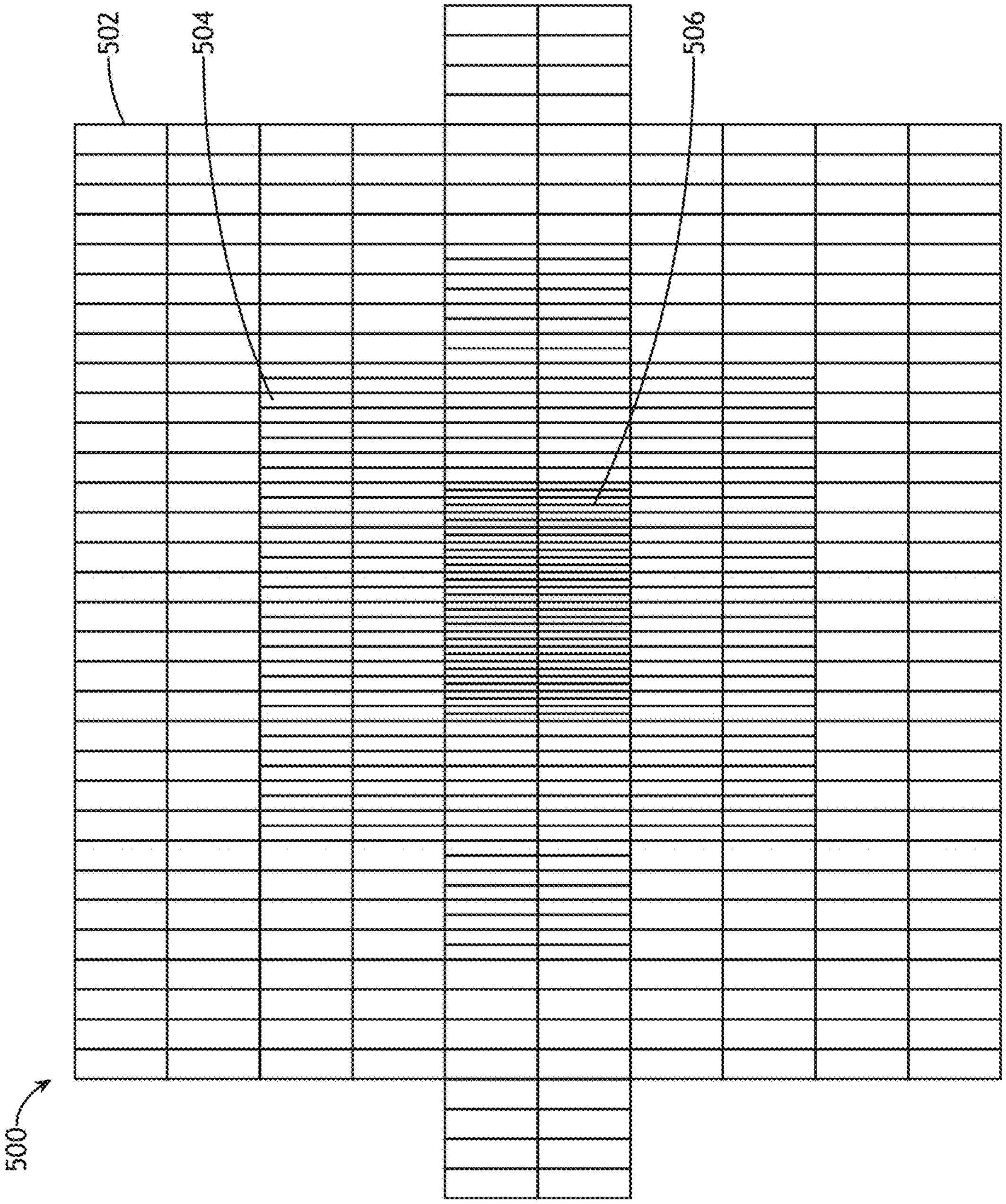
FIG. 5 shows a front view of a card-based array according to an exemplary embodiment.

Referring to FIG. 5, a front view of a 2D card-based array 500 according to an exemplary embodiment is shown. The 2D array 500 includes a chassis having bays for receiving subarrays, each including one or more PCBs 502, 504, 506 configured to operate with in a frequency range. The PCBs 502, 504, 506 may be disposed to define operation regions for specific frequency ranges. For example, with specific reference to FIG. 5, a central region of the 2D array 500 comprises high-frequency band PCBs 506. Furthermore, a concentric region surrounding the central region comprises mid-frequency band PCBs 504. Finally, a peripheral region of the 2D array 500 comprises low-frequency band PCBs 502. PCBs 502, 504, 506 are organized into subarrays of multiple PCBs 502, 504, 506, each subarray configured to be swappable into bays defined by the chassis of the 2D array 500.

The disposition of PCBs 502, 504, 506 and subarrays may be defined by a desired radiation pattern. It may be appreciated that sections of the chassis may include subarrays of any type to define regions specifically configured for operation within a desired frequency range. Multiple regions may be arbitrarily defined by swapping in appropriate subarrays. Subarrays may be swapped "in the field" based on mission specific parameters without dismantling the chassis or disturbing other subarrays.

A horizontal Wavelength Scaled Aperture may be realized by placing the highest high-frequency band subarrays 2D in the middle of the array 500, then blending into the mid-frequency band subarrays, and then into the low-frequency band subarrays, as one moves outward horizontally from the aperture center. This would likely require the use of thermal spreaders for lateral cooling rather than vertical cooling.

Figure 6A:
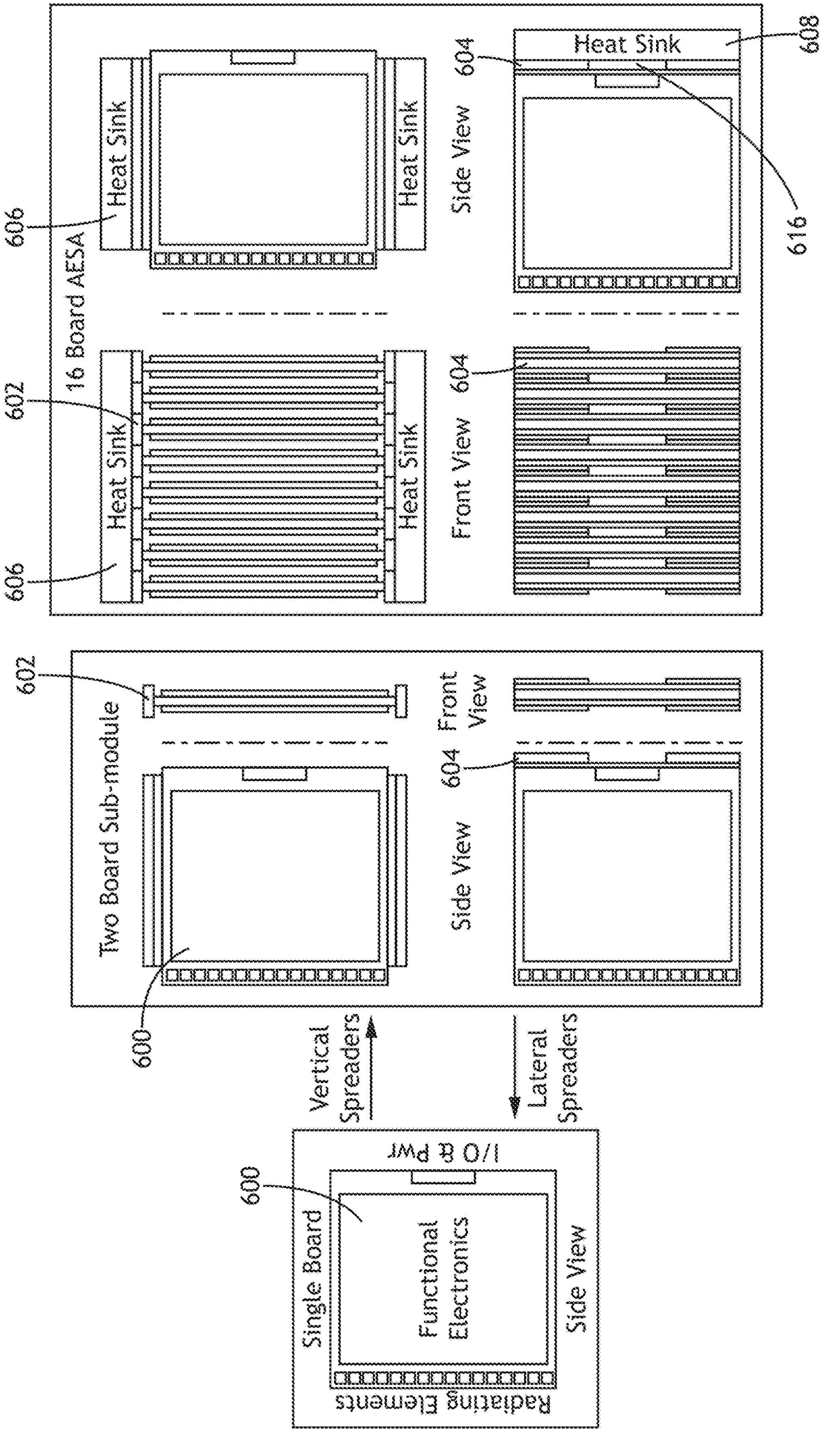
FIG. 6A shows side and front views of heat management features of a card-based array according to an exemplary embodiment.
Figure 6B:
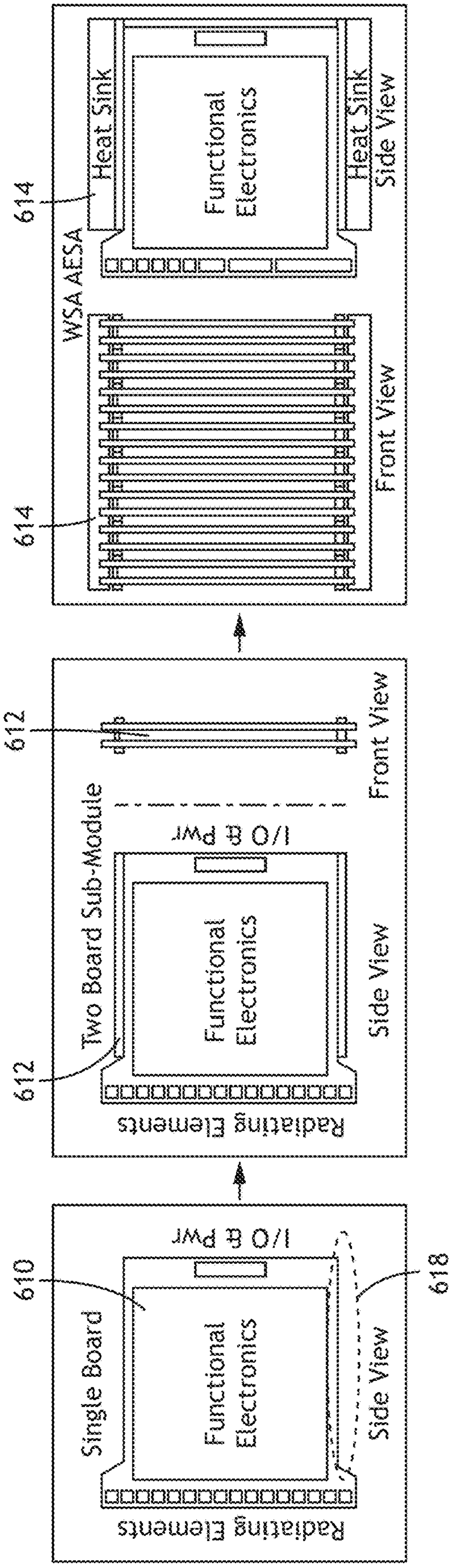
FIG. 6B shows side and front views of heat management features of a card-based array according to an exemplary embodiment.

Referring to FIGS. 6A-6B, side and front views of heat management features of a card-based array according to exemplary embodiments are shown. An array comprised of swappable subarrays includes a plurality of PCBs 600, each configured to operate in specific frequency ranges. The PCBs 600 generate heat during operation, requiring thermal management.

In at least one embodiment, each PCB 600 includes vertical spreader features 602 configured to maximize heat rejection surfaces and reduce thermal path length to reach a corresponding heat sink 606 disposed above or below the PCB 600 within either a subarray housing or an array chassis as described herein.

Alternatively, or in addition, a PCB 600 may include horizontal spreader features 604. Horizontal spreader features 604 may be configured to eliminate or reduce the frame/chassis above and below the PCB 600 by removing heat sinks above and below the PCBs 600. Such embodiments may allow for greater extension in vertical directions.

PCBs 600 must necessarily engage electrical input/output (I/O) and power elements in the corresponding subarray housing/chassis. Therefore, lateral spreaders 604 may define a gap 616 to facilitate engagement with such I/O power elements.

In at least one embodiment, each PCB 610 may define recessed regions 618 such that the radiating elements extend sufficiently above and below the electronics disposed on the PCB 610 to allow space for vertical spreader features 612 and corresponding heat sinks 614. Such embodiment may allow for superior cooling and therefore higher power capacity, and greater extension in vertical directions.

In at least one embodiment, multiple PCBs 600, 610 may be combined in to a single sub-module wherein adjacent PCBs 600, 610 may include an interposed spreader to transfer heat to vertical or lateral elements in contact with corresponding heat sinks 606, 608, 614.

Vertical or lateral spreaders 602, 604, 612 may be comprised of aluminum, copper, graphite composites, heat pipe assemblies, or the like. Furthermore, heat sinks 606, 608, 614 may be air-cooled, liquid-cooled, conductive spreaders, phase change/transient coolers, or the like.

Figure 7A:
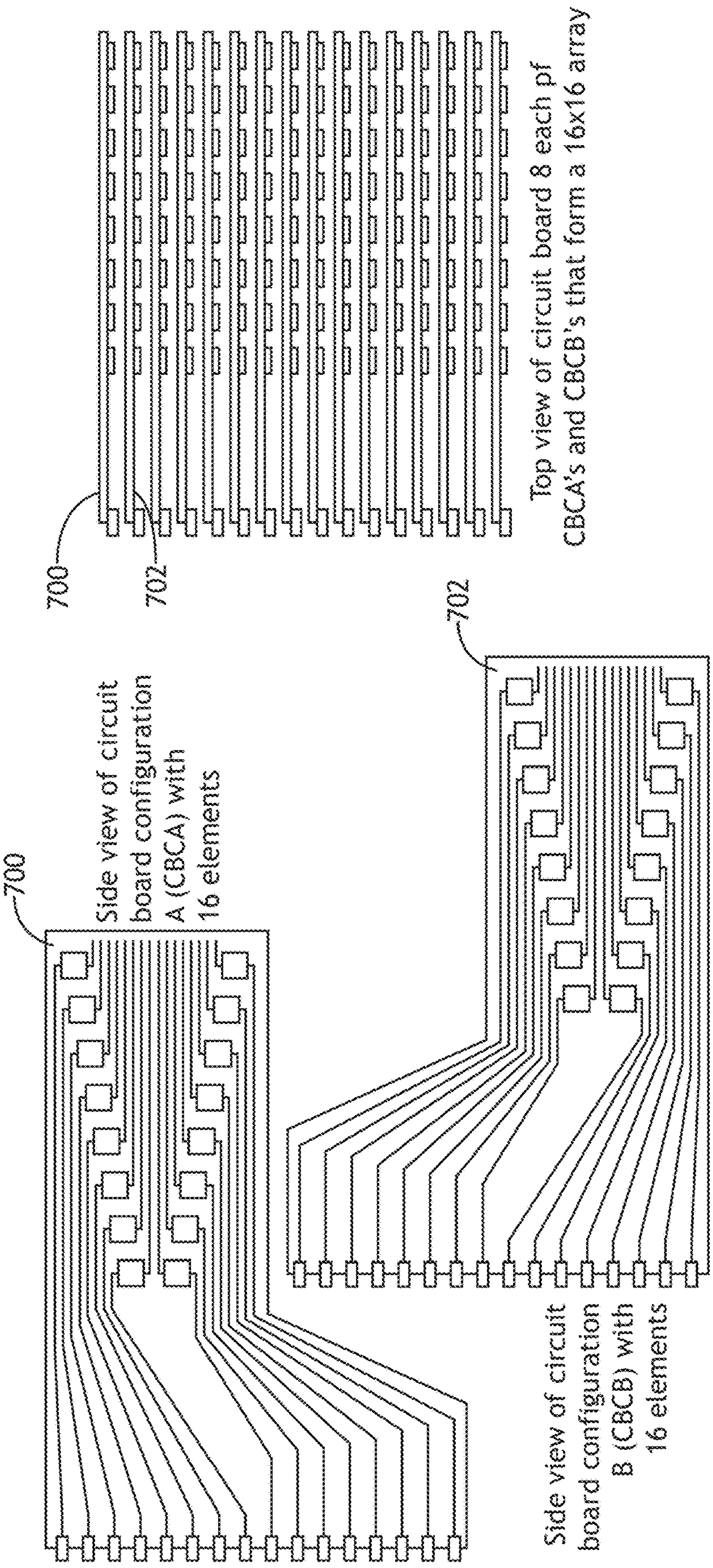
FIG. 7A shows block diagrams of L-boards according to an exemplary embodiment.
Figure 7B:
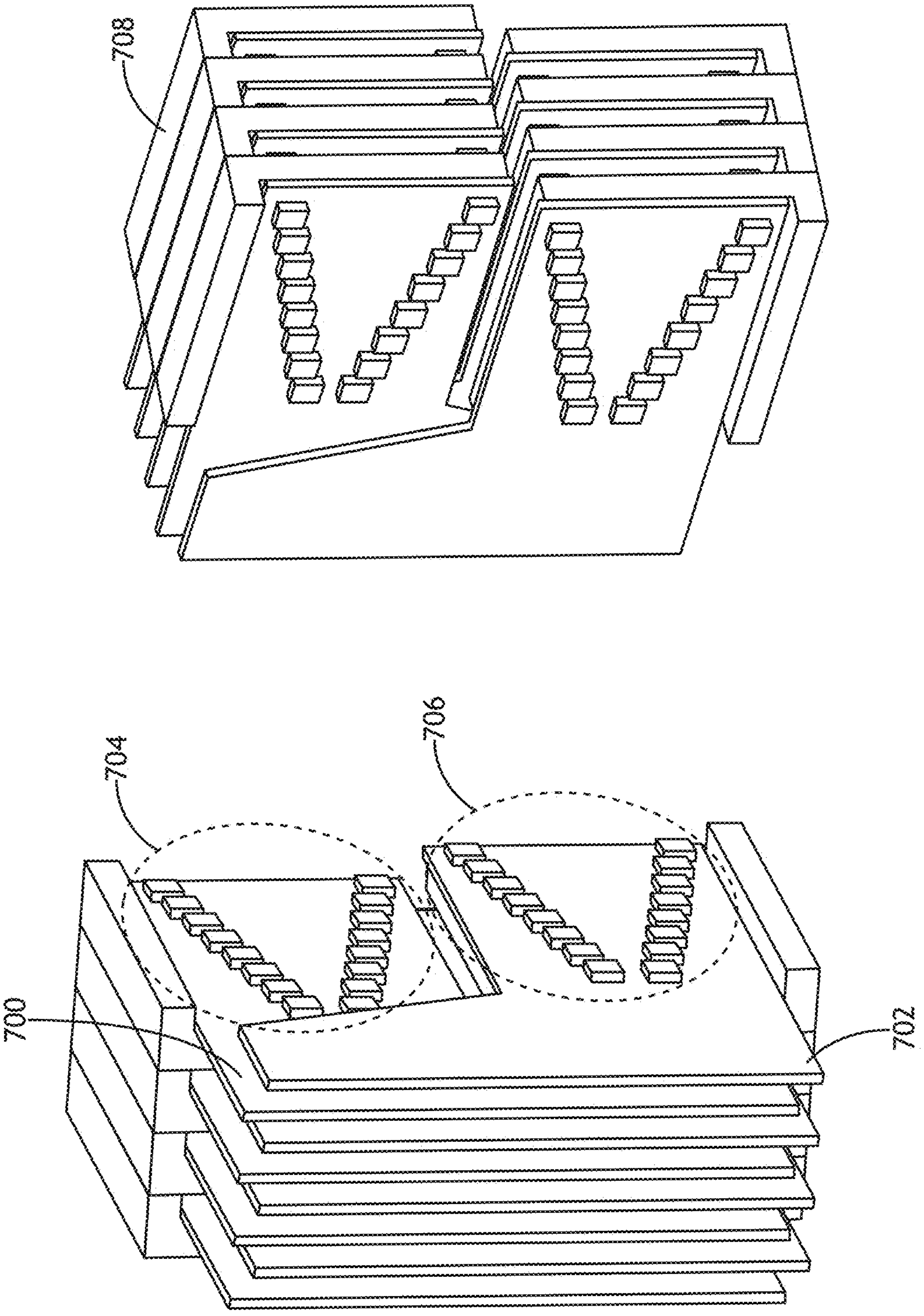
FIG. 7B shows a perspective view of an array of L-boards according to an exemplary embodiment.

Referring to FIGS. 7A-7B, block diagrams of L-boards 700, 702, and perspective views, according to an exemplary embodiment are shown; such L-boards 700, 702 may be more fully understood with reference to U.S. patent application Ser. No. 18/404,130 (filed Jan. 4, 2024), incorporated herein by reference. In at least one embodiment, the L-boards 700, 702 define primary thermal spreader paths vertical to heat sinks 708 above and below the array. The shape of the L-boards 700, 702, where adjacent L-boards 700, 702 provide space for corresponding electronics 704, 706, provides volume for wider thermal spreaders with greater thermal efficiency. In at least one embodiment, lateral spreaders may be used to carry heat to the rear of the array, allowing adjoining arrays without heat sinks above and below.

Alternatively, thermal spreaders may include holes to make room for components on the adjacent L-boards 700, 702. L-boards 700, 702 may thereby be placed closer together.

PCB arrays enable more space for circuitry as well as thermal management. Thermal flux density generally increases as the operational bandwidth of the array increases with frequency due to the electromagnetic requirement that AESA aperture radiating elements be spaced no wider than ½ wavelength to prevent grating lobes over the AESA beam scan volume.

Embodiments of the present disclosure enable PCBs in subarrays for a common chassis, wherein the chassis connections for each subarray are agnostic. The array is thereby dynamically reconfigurable within a common mechanical chassis that has common embedded thermal management, i.e. "plug and play". An AESA for a given air platform asset (e.g., a UAV) may be easily reconfigured in-situ for a given mission. Such reconfiguration may be for a specific frequency spectrum, a fundamental architecture, or both. Such embodiments may be more cost effective than a large inventory of different types of AESAs, each with mechanical attachment/electrical I/O compatibility.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An antenna apparatus comprising:
- a chassis defining a plurality of subarray bays, and comprising:
  - heat sinks disposed to thermally engage subarrays in each of the plurality of subarray bays; and
  - electronic connection elements disposed to engage subarrays in each of the plurality of subarray bays; and
- a plurality of replaceable subarrays, each configured to engage any subarray bay in the chassis and be removed without disassembly of the chassis or removal of any other subarray,
- wherein:
  - the subarrays are ½ wave lattice spaced for operation at a highest operating frequency; and
  - the subarrays are configured within a wavelength scaled aperture (WSA) architecture.

2. The antenna apparatus of claim 1, wherein each of the plurality of subarrays comprises at least one printed circuit board (PCB) having a plurality of radiating elements, each PCB configured to operate in a frequency range.

3. The antenna apparatus of claim 2, wherein each of the plurality of subarrays further comprises a spreader disposed to transfer heat from the at least one PCB to a corresponding heat sink in the chassis or attached to the chassis.

4. The antenna apparatus of claim 3, wherein the spreader comprises a vertical spreader.

5. The antenna apparatus of claim 3, wherein the spreader comprises a lateral spreader.

6. The antenna apparatus of claim 1, wherein:
- a first subarray in the plurality of subarrays is configured to operate in a first frequency range; and
- a second subarray in the plurality of subarrays is configured to operate in a second frequency range distinct from the first frequency range.

7. The antenna apparatus of claim 6, wherein a third subarray in the plurality of subarrays is configured to operate in a third frequency range, distinct from the first frequency range and the second frequency range.

8. An active electronically scanned array comprising:
- a chassis defining a plurality of subarray bays, and comprising:
  - heat sinks disposed to thermally engage subarrays in each of the plurality of subarray bays; and
  - electronic connection elements disposed to engage subarrays in each of the plurality of subarray bays; and
- a plurality of replaceable subarrays, each configured to engage any subarray bay in the chassis and be removed without disassembly of the chassis or removal of any other subarray,
- wherein:
  - the subarrays are ½ wave lattice spaced for operation at a highest operating frequency; and
  - the subarrays are configured within a wavelength scaled aperture (WSA) architecture.

9. The active electronically scanned array of claim 8, wherein each of the plurality of subarrays comprises at least one PCB having a plurality of radiating elements, each PCB configured to operate in a frequency range.

10. The active electronically scanned array of claim 9, wherein each of the plurality of subarrays further comprises a spreader disposed to transfer heat from the at least one PCB to a corresponding heat sink in the chassis.

11. The active electronically scanned array of claim 10, wherein the spreader comprises a vertical spreader.

12. The active electronically scanned array of claim 10, wherein the spreader comprises a lateral spreader.

13. The active electronically scanned array of claim 8, wherein:
- a first subarray in the plurality of subarrays is configured to operate in a first frequency range; and
- a second subarray in the plurality of subarrays is configured to operate in a second frequency range distinct from the first frequency range.

14. The active electronically scanned array of claim 13, wherein a third subarray in the plurality of subarrays is configured to operate in a third frequency range, distinct from the first frequency range and the second frequency range.

15. An antenna system comprising:
- a chassis defining a plurality of subarray bays, and comprising:
  - heat sinks disposed to thermally engage subarrays in each of the plurality of subarray bays; and
  - electronic connection elements disposed to engage subarrays in each of the plurality of subarray bays; and
- a plurality of subarrays, each configured to engage any subarray bay in the chassis and be removed without disassembly of the chassis or removal of any other subarray, a first set of subarrays configured to operate in a first frequency range, and a second set of subarrays configured to operate in a second frequency range distinct from the first frequency range,
- wherein:
  - a central region of the antenna system comprises subarrays configured to operate in a highest operating frequency, and a peripheral region comprises subarrays configured to operate in a lower frequency range;
  - the subarrays are ½ wave lattice spaced for operation at the highest operating frequency; and the subarrays are configured within a wavelength scaled aperture (WSA) architecture.

16. The antenna system of claim 15, wherein each of the plurality of subarrays comprises at least one PCB having a plurality of radiating elements, each PCB configured to operate in a frequency range.

17. The antenna system of claim 16, wherein each of the plurality of subarrays further comprises a spreader disposed to transfer heat from the at least one PCB to a corresponding heat sink in the chassis.

18. The antenna system of claim 17, wherein the spreader comprises a vertical spreader.

19. The antenna system of claim 17, wherein the spreader comprises a lateral spreader.

20. The antenna system of claim 15, wherein the first set of subarrays are disposed in a center region of the chassis and the second set of subarrays are disposed in a peripheral region of the chassis.

* * * * *